United States Patent
Khare et al.

(10) Patent No.: US 10,360,482 B1
(45) Date of Patent: Jul. 23, 2019

(54) CROWD-SOURCED ARTIFICIAL INTELLIGENCE IMAGE PROCESSING SERVICES

(71) Applicant: Amazon Technologies, Inc., Seattle, WA (US)

(72) Inventors: Vineet Khare, Redmond, WA (US); Gurumurthy Swaminathan, Redmond, WA (US); Xiong Zhou, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 15/830,952

(22) Filed: Dec. 4, 2017

(51) Int. Cl.
| | | |
|---|---|---|
| G06K 9/62 | (2006.01) | |
| G06K 9/66 | (2006.01) | |
| G06N 3/04 | (2006.01) | |
| G06N 3/08 | (2006.01) | |

(52) U.S. Cl.
CPC ............ G06K 9/66 (2013.01); G06K 9/6269 (2013.01); G06N 3/04 (2013.01); G06N 3/08 (2013.01)

(58) Field of Classification Search
CPC .......... G06K 9/66; G06K 9/6269; G06N 3/08; G06N 3/04
See application file for complete search history.

(56) References Cited

U.S. PATENT DOCUMENTS

| | | | | |
|---|---|---|---|---|
| 2015/0016712 | A1* | 1/2015 | Rhoads | G06K 9/00208 382/154 |
| 2015/0227741 | A1* | 8/2015 | Permeh | G06F 21/51 726/22 |
| 2017/0076438 | A1* | 3/2017 | Kottenstette | G06K 9/00637 |
| 2017/0286864 | A1* | 10/2017 | Fiedel | G06F 9/546 |
| 2017/0300814 | A1* | 10/2017 | Shaked | G06N 3/0472 |
| 2017/0330099 | A1* | 11/2017 | de Vial | G06F 11/079 |
| 2018/0089592 | A1* | 3/2018 | Zeiler | G06N 3/0454 |

OTHER PUBLICATIONS

Justin Cheng et al., "Flock: Hybrid Crowd-Machine Learning Classifiers", Proceding CSCW'15 Proceedings of the 18th ACM conference on Computer Supported Cooperative Work & Social Computing—Vancouver, BC, Canada—Mar. 14-18, 2015, pp. 600-611.*

Denis Lalanne, "Fusion Engines for Multimodal Input: A Survey", ICMI-MLMI'09 Proceedings of the 2009 international Conference on Mutimodal interfaces, pp. 153-160.*

* cited by examiner

Primary Examiner — Samir A Ahmed
(74) Attorney, Agent, or Firm — Knobbe, Martens, Olson & Bear, LLP

(57) ABSTRACT

Features related to systems and methods for generating a machine learning model that is a composite of at least two other models (e.g., crowd-sourced models contributed by users) are described. Each of the contributed models provide output values that may not be to scale. To account for these differences, a normalization factor for a first machine learning model is generated to adjust values produced by the first machine learning model to correspond with results from the second machine learning model. The crowd-sourced models along with the normalization factor are included in the new image model generated in the claims.

20 Claims, 7 Drawing Sheets

CROWD-SOURCED ARTIFICIAL INTELLIGENCE IMAGE PROCESSING SERVICES

BACKGROUND

A service provider may make a network service available for use by third parties. For example, the field of utility computing involves a service provisioning model in which a service provider makes computing resources and infrastructure management available to client devices on demand. For example, a user may wish to deploy an image processing service to analyze image data such as of products, users, or documents. Image processing services can rely on sophisticated modeling and training to provide accurate analysis of image data. The modeling and training can be resource and time intensive operations and require significant understanding of the complexities contributing needed to produce a satisfactory model.

Network service models allow users to access networked resources (e.g., applications, services, and data) via a client program, such as a web browser. Network services, such as web services, provide programmatic access to networked resources including technology platforms (e.g., image processing applications and services) and data (e.g., image data and other databases) hosted on networked computers via a service interface. Generally speaking, a network service interface provides a standard, cross-platform API (Application Programming Interface) for communication between a client requesting some service to be performed and the service provider. In some embodiments, a network service interface may be configured to support the exchange of documents or messages including information describing the service request and response to that request. Such documents, or messages, may be exchanged using standardized or proprietary messaging protocols, such as the Hypertext Transfer Protocol (HTTP), and may be formatted in a platform-independent data format, such as eXtensible Markup Language (XML).

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
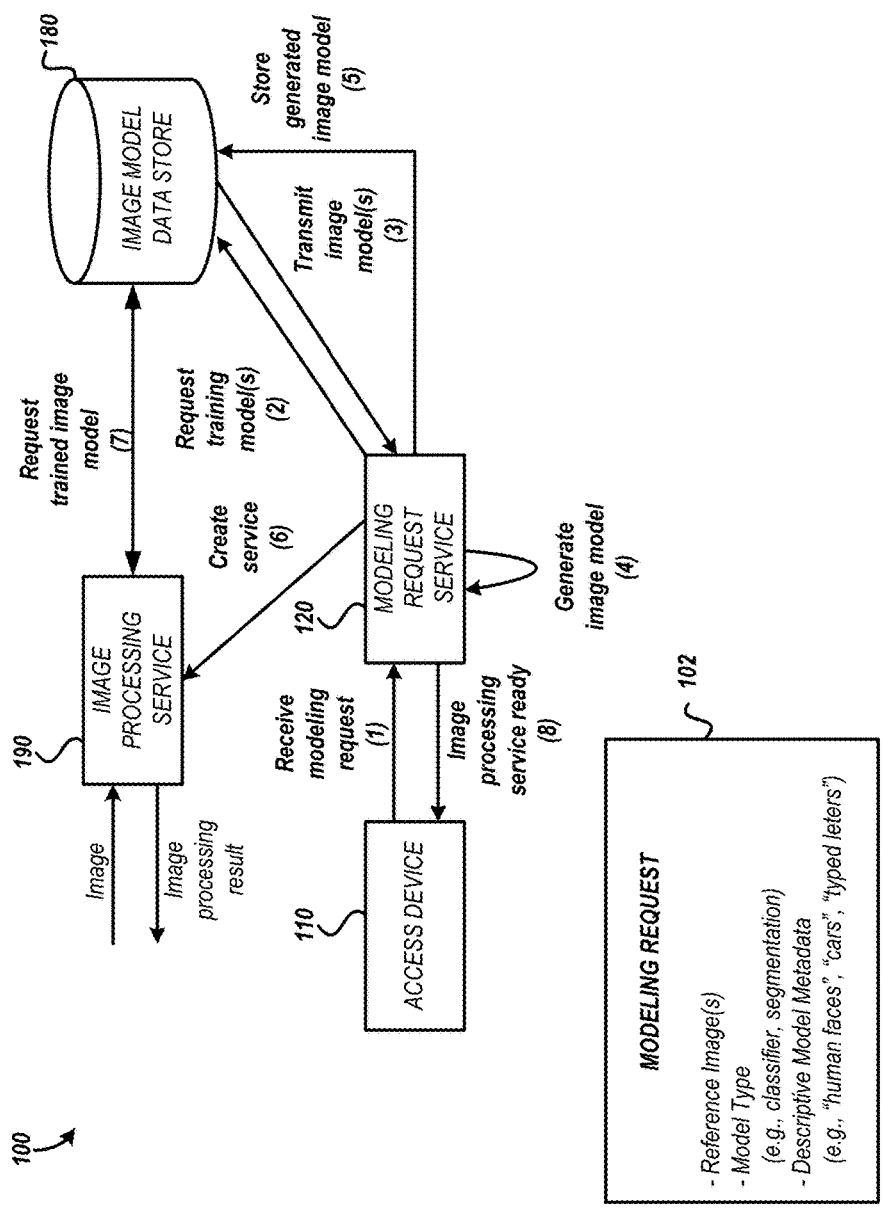
FIG. 1 is a block diagram showing an environment for generating an image processing service from a modeling request.

Network services can be powerful tools that allow clients to perform a wide variety of processing operations. For example, image analysis algorithms can be applied to many domains, such as medical or health care, social networks, autonomous driving, and others. With advances in artificial intelligence, machine learning, and related applications, more and more users are engaging with such systems. Wide adoption, however, can be hindered in part because not all users in these domains have sufficient time or resources to deploy state-of-the-art solutions. The features described in this application provide an end-to-end solution to generate image processing services for users with little or no prior knowledge of image analysis or artificial intelligence techniques or limited access to data to train a useful model using crowd-sourced image recognition models.

With the increasing amount of data and computing power, deep learning has achieved magnificent success in image classification tasks. The intelligently designed neural networks are capable of accurately recognizing objects shown in an image for a specific domain. However, training a sophisticated neural network, often with a very large dataset, can take days even months. Furthermore, the trained model can only be generalized to perform similar recognition tasks (e.g., for the same object or within the same domain). For example, a machine learning model that is trained to classify digits will not accurately distinguish between a dog and a cat. To make a classifier work for additional or different object categories, one typically needs to re-train the model with corresponding training data.

Some implementations tackle this problem by either transferring knowledge that is learned from previous tasks to the new machine learning model or by adapting machine learning models that provide accurate identification in another, related domain. One major drawback of these approaches is the need for sufficient labeled data to train the new machine learning model. To generate the new machine learning model for identifying plant species, for example, plant images will need to be analyzed and labeled by a human expert to provide the necessary training information for classifying plant species. Thus, even if a machine learning model is used as a starting point, the need for new or additional training data makes the re-learning process expensive and time-consuming, if not impossible, due to the lack of sufficient labeled training data.

The crowd-sourced image recognition systems and methods described include features to address these issues. In one aspect, the systems and methods combine machine learning models that are trained for different tasks. Instead of training one machine learning model for all categories, features are provided to integrate machine learning models that are prominent in their own domains. For example, a first user may provide a machine learning model for distinguishing garden tools, a second user may provide a machine learning model for recognizing office supplies, and a third user may provide a machine learning model for separating sport products.

The features described combine such different machine learning models and to generate a new, integrated machine learning model based on a user request. For example, assume a new user wants to classify animals but only has a few labeled examples which may not be sufficient to train a deep neural network. The crowd-sourced image recognition may identify relevant models (e.g., model 1 for dogs, model 2 for cats, model 3 for birds, etc.) based on the user's request and combine the relevant models as a single model for the animal classification. The contributed machine learning models (e.g., crowd-sourced models) can be selected based either on their confidence levels or on the consistency between their predictions and the labels of user's data. In some embodiments, machine learning models are selected based on producing the image recognition scores (e.g., prediction confidence value for an object recognition or segmentation).

The outputs of all contributed models are then combined and calibrated using the labeled data from the user requesting the new model. One factor of the crowd-sourced image recognition is to have a machine learning model library that contains enough machine learning models for classifying different objects. To encourage users to contribute models, embodiments of the systems and methods include attribution metrics to provide an incentive for contributing useful machine learning models. For example, the image processing system may share a benefit generated from image model processing with the contributors of models used to generate the new machine learning model. In some embodiments, images being processed by a generated model may be monitored. The contribution that a crowd-sourced model contributed by a user had in the processing performed by the generated model may be attributed to the user who provided the crowd-soured model. For example, the processing may track how many times the crowd-sourced model resulted in the highest confidence score for an image being processed (e.g., a specific interaction with the image processing model). Equation (1) provides one expression of allocating the benefit to the user contributing a crowd-sourced machine learning model to a generated image model.

$$b_{user} = b_{total}\left(\frac{t_{user}}{i*(t_{total})}\right) \quad \text{EQUATION 1}$$

where:
$b_{user}$ represents an attribution amount of a benefit allocated to the user contributing the crowd-sourced machine learning model;
$b_{total}$ represents a total benefit for the generated image model;
i represents a number of images processed by the generated image model;
$t_{user}$ represents a total number of times the crowd-sourced machine learning model provided the highest confidence result for the i images; and
$t_{total}$ represents a total number of highest confidence results for the i images.

By training a relatively small and simple machine learning model and integrating the smaller models contributed by users, the crowd-sourced image recognition provides a divide and conquer solution to machine learning. The systems and methods described require less training data and save training resources (e.g., time, memory, processor cycles, power). The reuse of trained machine learning models also allows the sharing of artificial intelligence without the need to share underlying training data for the respective contributed models because users provide the trained models rather than the training data.

In some embodiments, users may contribute training data in addition to or as an alternative to the models. Using the contributed data from multiple users, a new model can be trained that classifies multiple categories of items shown in the contributed data. In such cases, users can contribute their data to generate a new model. Attribution may be provided based on the amount of data provided in relation to the usage of these models. In some implementations, the data may be scrambled to protect the specific underlying data from different users. The scrambling may be based on keys unique to each data owner such that the user can control dissemination and use of the training data.

FIG. 1 is a block diagram showing an environment for generating an image processing service from a modeling request. The environment 100 includes several entities which communicate to generate an image processing service 190. The image processing service 190 receives an image as an input and generates an image processing result (sometimes referred to as a prediction) as an output. The image processing result may indicate whether a particular object is shown in the input image, where a particular object is shown in the input image, or what object or objects are shown in the input image. In some embodiments, the image processing result includes a set of indications, each associated with a confidence in the result. For example, if the image provided to the image processing service 190 shows a basketball, the machine learning model for recognizing sporting goods may provide an image processing result indicating that a basketball is shown with a 90% confidence and a volleyball is shown with a 30% confidence, and a football is shown with a 1% confidence. In this way, the requesting device can perform further processing based not only on the recognized objects but also the model's confidence in the recognition.

In the embodiment shown in FIG. 1, the creation of the image processing service 190 is initiated by a modeling request 102. The modeling request 102 includes reference images. In some embodiments, the modeling request 102 includes the images as part of the request. In some embodiments, the modeling request 102 includes a reference to the reference images such as a network location of the training image data. The modeling request 102 includes a model type indicating a task for the model should be trained to perform such as classify objects shown in an image, segment objects shown in an image, or other machine learning image processing tasks such as those related to computer vision. The modeling request 102 includes descriptive model metadata that indicates the objects or task associated with the requested model. The modeling request 102 optionally includes an identifier for the client requesting the model. The identifier of the client may be used to identify a topical domain to which the requested model will apply. For example, if the client is a doctor, the topical domain for the requested model may be medical imaging. The domain may be identified based on a profile stored in a data store for the client. The request may include an identifier for the client which can be used to retrieve the profile to determine one or more domains associated with the client. The topical domain information for the client may be compared with domain information for existing models or clients that created the existing models. If the domain information for the request corresponds to domain information for an existing model, the existing model may be included in the process of generating the new machine learning model.

The access device 110 transmits the modeling request 102 to a modeling request service 120. The modeling request service 120 interprets the modeling request 102 and coordinates the generation of an image processing service 190 for the modeling request 102. In previous systems, a new image model may be trained to perform the task specified in the modeling request 102. However, training each model from scratch for each request can be time or resource intensive. Embodiments of the present disclosure can avoid this inefficiency and high resource demand.

To address training inefficiencies, the modeling request service 120 identifies previously trained models from contributed by one or more users that are stored in an image model data store 180 based on the request. For example, if the image model data store 180 includes a previously trained models associated with descriptive metadata corresponding to the descriptive metadata provided in the modeling request 102, the previously trained models may be included in the requested model. Metadata, such as domain information, may be associated with a client requesting the previously trained models and used to identify a previously trained model.

As used herein a "data store" may be embodied in hard disk drives, solid state memories and/or any other type of non-transitory computer-readable storage medium accessible to or by a device such as an access device, server, or other electronic computing device described. A data store may also or alternatively be distributed or partitioned across multiple local and/or remote storage devices as is known in the art without departing from the scope of the present disclosure. In yet other embodiments, a data store may include or be embodied in a data storage web service.

In some embodiments, the previously trained models are selected based on frequency of access, inclusion in other generated models, or other model metrics. For example, if the modeling request 102 identifies an object recognition model for distinguishing sporting goods from electronics, the image model data store 180 may include multiple models associated with the object type "sporting goods" and multiple models associated with the object type "electronics". If the "sporting goods" models provide similar results (e.g., equivalent predictions for a test image), other metrics may be used to inform the selection. In some embodiments, metrics for the models are used identify which of the multiple models to select. The metrics may be generated based on interaction data with image processing services associated with different models. For example, if a model is used many times over a period of time as compared to another model, the model's utilization may indicate that the model is superior to other models. Alternative or additional metrics that are used to select models include the ranking of a model for use in servicing previous requests or a similarity between data used to train the models. For example, if the modeling request 102 includes reference images of a particular size or quality, the size or quality is compared with the size or quality of the data used to train the models included in the image model data store 180. In some embodiments, the model having training data with the size or quality most similar to the size or quality of the reference images is selected.

Based on the one or more of the factors described, the modeling request service 120 identifies the trained models to include in the new machine learning model for the modeling request 102. Because the different trained models may provide different confidence values for images, in some embodiments of the modeling request service 120, a normalization factor is generated to ensure the output values from each of the identified trained models are accurate relative to each other. For example, a first model may generate a confidence level of 80 for identifying an object whereas the second model may generate a confidence level of 90 for identifying an object. As both values are indicative of a positive identification, the modeling request service 120 includes a normalization layer for one or both of the models to ensure that the output values are consistent. Table 1 summarizes example results for two different models, one which recognizes electronics and one that recognizes sporting goods.

TABLE 1

|  | Results for Model 1 - Electronics | Results for Model 2 - Sporting Goods |
| --- | --- | --- |
| Input Image 1 - "smartphone" | Smartphone - 90<br>Tablet - 80<br>Laptop - 60 | Hockey Puck - 10<br>Basketball - 0<br>Baseball - 0 |
| Input Image 2 - "basketball" | Smartphone - 10<br>Tablet - 5<br>Laptop - 0 | Basketball - 80<br>Baseball - 50<br>Hockey Puck - 0 |

In the example shown in Table 1, the positive identification of a basketball with a confidence of 80 should be normalized to the positive identification of a smartphone at a confidence of 90. In some embodiments, the normalization factor is the difference between the two models. In some embodiments, a normalization factor may be applied to each model result such as, in the example shown in Table 1, (−5) for the electronics model and (+5) for the sporting goods model.

After generating the new machine learning model, the modeling request service 120 shown in the environment 100 of FIG. 1 transmits the trained image model to the image model data store 180. The transmission causes the trained image model to be included for consideration for future model requests. An identifier is associated with the trained image model to aid in identifying the model.

The modeling request service 120 generates the image processing service 190 based on the trained image model. Generating the image processing service 190 may include creating a service instance to receive image requests which are processed using the trained image model to provide image processing results.

Figure 2:
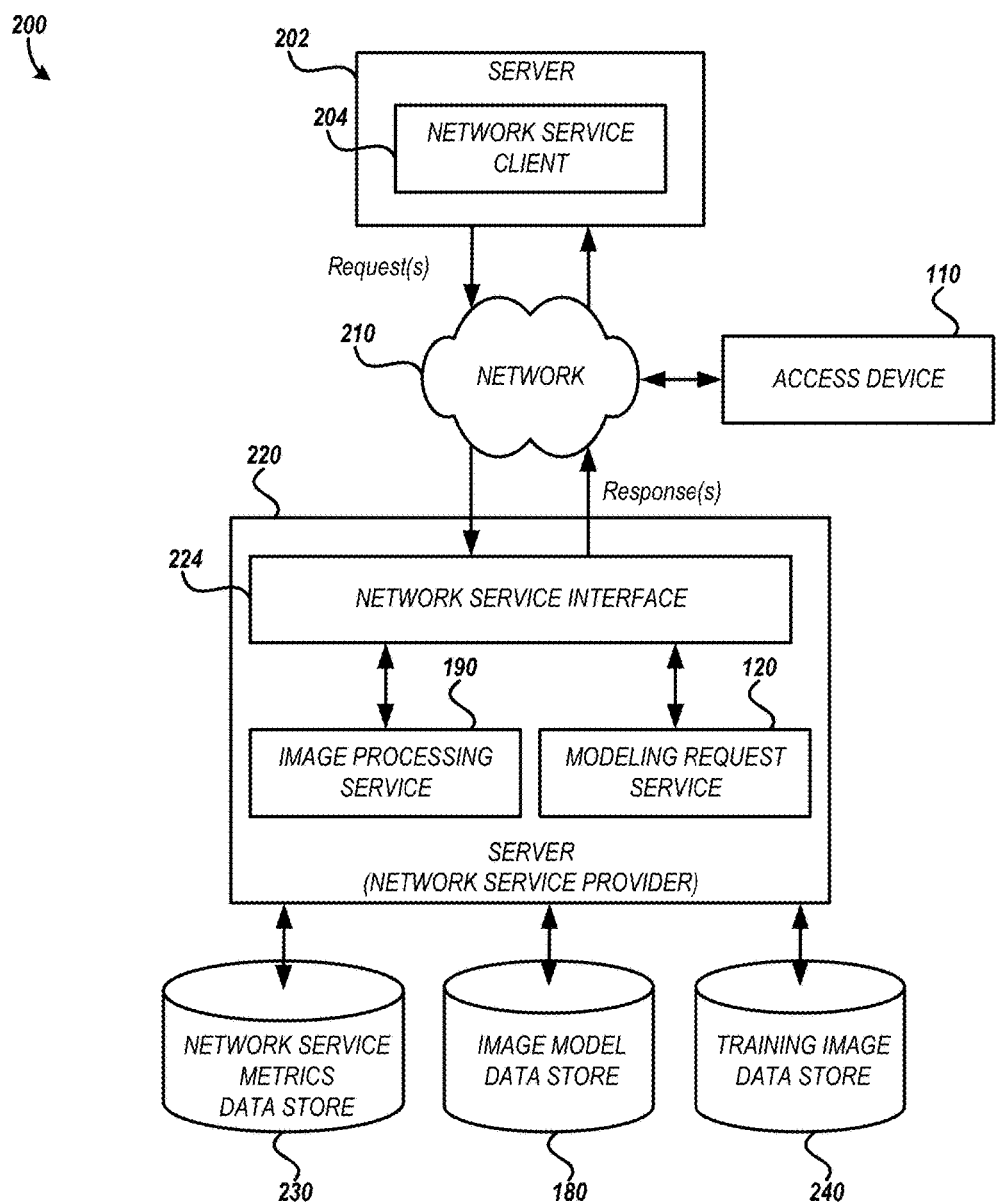
FIG. 2 is a block diagram showing an environment including a network service provider for providing image processing services.

FIG. 2 is a block diagram showing an environment including a network service provider for providing image processing services. The environment 200 shows the interaction between a network service client 204 and a network service provider server 220. In this embodiment, a network service interface 224 is implemented on a server 220 coupled to a network 210. The server 220 may be referred to as a "network service provider". The server 220 includes one or more applications or services such as an image processing service 190 and a modeling request service 120. The server 220 may be coupled to data storage 140 for storing information in database 142.

In the embodiment shown in FIG. 2, the server 202 is coupled to the network 210. The server 202 includes a network service client 204. The network service client 204 programmatically accesses an application or service (e.g., the image processing service 190 or the modeling request service 120) of the server 220 via the network service interface 224. The network service interface 224 provides a programmatic interface via an API through which at least some functionality of an application or service (e.g., the image processing service 190 or the modeling request service 120) is programmatically accessed by a network service client 204. The server 202 or the server 220 may provide a network service such as a web site accessible by an access device 110 via browsers or other applications executing on the access device 110. In some embodiments, the network service client 204 is configured to access at least some functionality of an application or service of the server 220 and/or at least some data in a data store coupled with the server 220 (e.g., the network service metrics data store 230, the image model data store 180, or the training image data store 240) via the network service interface 224. In some embodiments, the network service client 204 provides a network service to other client servers or access devices such as a web application.

To access the image processing service 190, network service client 124 sends a request message to network service interface 224 via the network 210. The network service provider server 220 identifies a requested service based on the request and provides the request to the appropriate service For example, if the request include modeling parameters to create or update an image processing service, the network service interface 224 detects the modeling parameters as one indicator of the destination for the request. In some embodiments, the endpoint to which the request is presented identifies the application or service to handle the request. For example, the modeling request service 120 may be hosted at a known network location (e.g., http://networkserviceprovider.com/services/modelingService). In such embodiments, requests presented to the endpoint will be routed to the modeling request service 120. The application provides a response to the request to the network service interface 224 which, in turn, provides the response to the device that transmitted the request (e.g., the server 202 or the access device 110).

As the network service interface 224 receives requests and transmits responses, the network service interface stores information regarding the service interactions in a network service metrics data store 230. The information regarding the service interactions may include a number of interactions with a service in total or per interaction type (e.g., search results, selection for inclusion in other models, image processing interactions, etc.). The service interaction information may include one or more of: number of requests routed to the service, number of responses sent from the service, the confidence of the responses, time taken for a service to respond to a request, resources utilized by a service to respond to a request, or memory requirements for the service.

In some embodiments, the network service interface 224 monitors a service to collect metrics while it is processing. For example, the selections made by the modeling request service 120 may be stored to identify which models or training data were used to create new machine learning models. A training image data store 240 is included in the embodiment shown in FIG. 2 to store images used to train one or more machine learning model. The training data includes images which have been previously processed to identify specific items of interest. The images may include the processing information as labels of the object or location of the object shown within the image. The quantity, quality, or both for the training image data may be determined and stored in the network service metrics data store 230 in association with the model generated based on the training data. In some embodiments, the modeling request service 120 stores the interaction metrics directly in the network service metrics data store 230.

In some embodiments, the interaction metrics are processed by the modeling request service 120 to determine a benefit to be attributed to contributing users. For example, consider a model that is generated using two crowd-sourced models. If the generated model is interacted with often, the benefit generated from the interactions is shared with the contributors such as according to Equation (1) above.

As another example, a model generated by the modeling request service 120 may be published as a new image processing service of the server 220. As shown in FIG. 2, the image processing service 190 may represent a final result of a request processed by the modeling request service 120. The interaction metrics for the image processing service 190, or similar image processing services, may include a number of requests, accuracy for responding to an image processing request, or the like. As with the modeling interaction information, the network service interface 224 or the image processing service 190 are configured to store the image processing information in a network service metrics data store 230.

Figure 3:
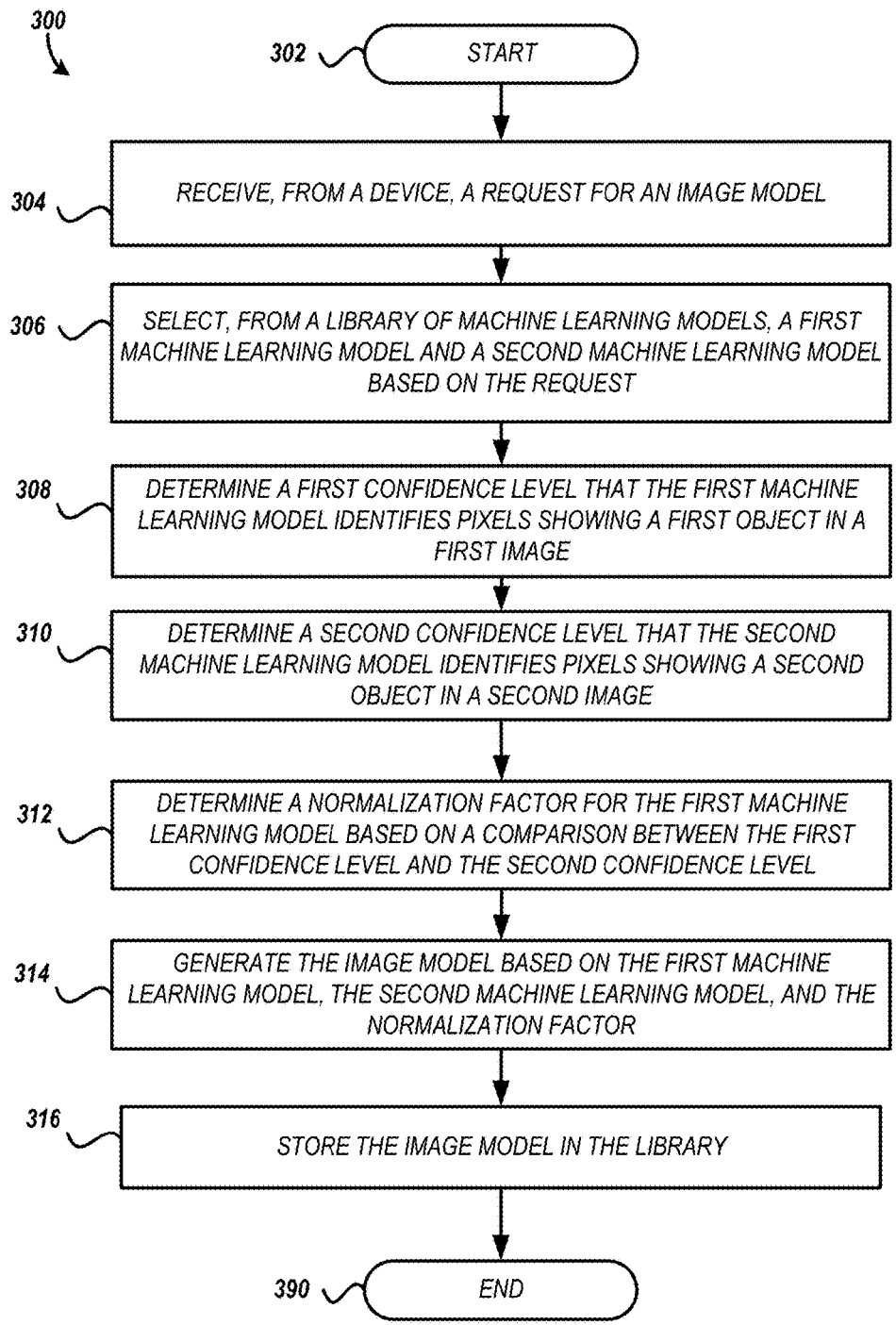
FIG. 3 is a process flow diagram showing an example of a method for generating an image model.

FIG. 3 is a process flow diagram showing an example of a method for generating an image model. The method 300 is implemented by a computing device such as the network service provider server 220 shown in FIG. 2 under the control of one or more processor. The method 300 illustrates one embodiment for taking an image model request and efficiently generating the image model using previously trained models.

The method 300 begins at block 302. At block 304, a request for an image model is received from an electronic communication device. In some embodiments, the request identifies a task for the image model to perform, and training data including a labeled image. The task is at least one of: identifying a location of an object within an image or identifying the object within the image. In some embodiments, the task is another computer vision process. The labeled image includes an identification of pixels showing the object within an image.

At block 306, a first machine learning model and a second machine learning model are identified from a library of machine learning models. The identification is, based on the task or the object associated with the request received at block 304. For example, the first and second machine learning model may include metadata indicating the types of object identified by the models. Descriptive metadata included in the modeling request is compared with the metadata associated with the models included in the library to identify those machine learning models which are relevant to the requested model. Domain information for the requesting client or user is compared in some embodiments to the domain associated with machine learning models in the library to identify those machine learning models which may be relevant to the requested model.

At block 308, a first confidence level that the first machine learning model identifies the pixels showing a first object included in a first image is determined. The first confidence level indicates how well the first machine learning model can perform the requested task for the training data associated with the request. In some embodiments, the first confidence level is generated by processing the first image with the first machine learning model to receive, as an output, the confidence for predicting the object.

At block 310, a second confidence level that the second machine learning model identifies the pixels showing a second object included in a second image is determined. The second confidence level indicates how well the second machine learning model can perform the requested task for the second image. In some embodiments, the second confidence level is generated by processing the second image with the second machine learning model to receive, as an output, the confidence for predicting the object.

At block 312, a normalization factor is determined for the first machine learning model based on a comparison between the first confidence level and the second confidence level. As discussed, In some embodiments, a normalization factor is determined for each model identified for inclusion in the image model.

At block 314, the image model is generated using the models identified at block 306 and the normalization factor determined at block 312. In some embodiments, generating the image model includes generating a normalization layer that: receives image processing results from the first machine learning model, and provides normalized image processing results based on the normalization factor. Some embodiments of block 314 include generating an output layer that: receives image processing results from the second machine learning model, receives the normalized image processing results from the normalization layer, and provides a final image processing result for the input image. In an embodiment where a machine learning model included in the image model was trained using scrambled training data, the image model may include a scrambling layer that receives the input image directed to the machine learning mode, adjusts pixels included in the input image based on the scrambling profile to generate a scrambled input image, and provides the scrambled input image to the machine learning model trained on scrambled images.

Figure 4:
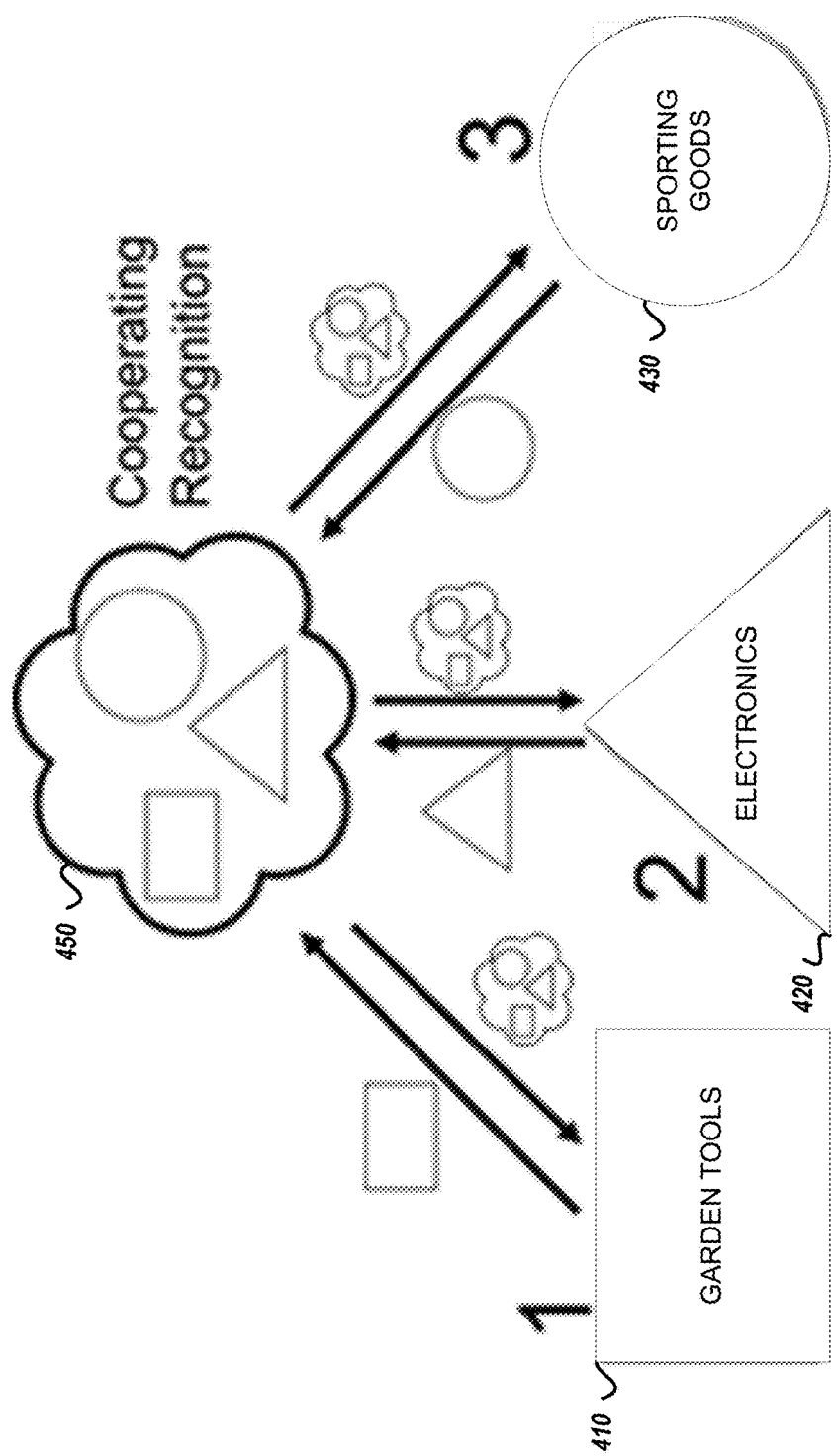
FIG. 4 is a functional diagram showing how contributed models are used to generate a new machine learning model.

FIG. 4 is a functional diagram showing how contributed models are used to generate a new machine learning model. FIG. 4 shows a first model 410 to identify garden tools, a second model 420 for identifying electronics, and a third model 430 for identifying sporting goods. In some embodiments, the models 410, 420, and 430 are convolutional neural network models. A convolutional neural network model includes one or more convolutional layers, one or more fully connected layers, and an output layer. Some convolutional neural network models include other layers such as a batch normalization layer for normalizing outputs for a layer within the model. The convolutional layers receive images to generate, from the output layer, an image processing result.

The generated model 450 includes each of the identified models (e.g., the first model 410, the second model 420, and the third model 430) to provide cooperating recognition in a single model. The generated model 450 is one example of the image model that is generated at block 314 of FIG. 3.

Figure 5:
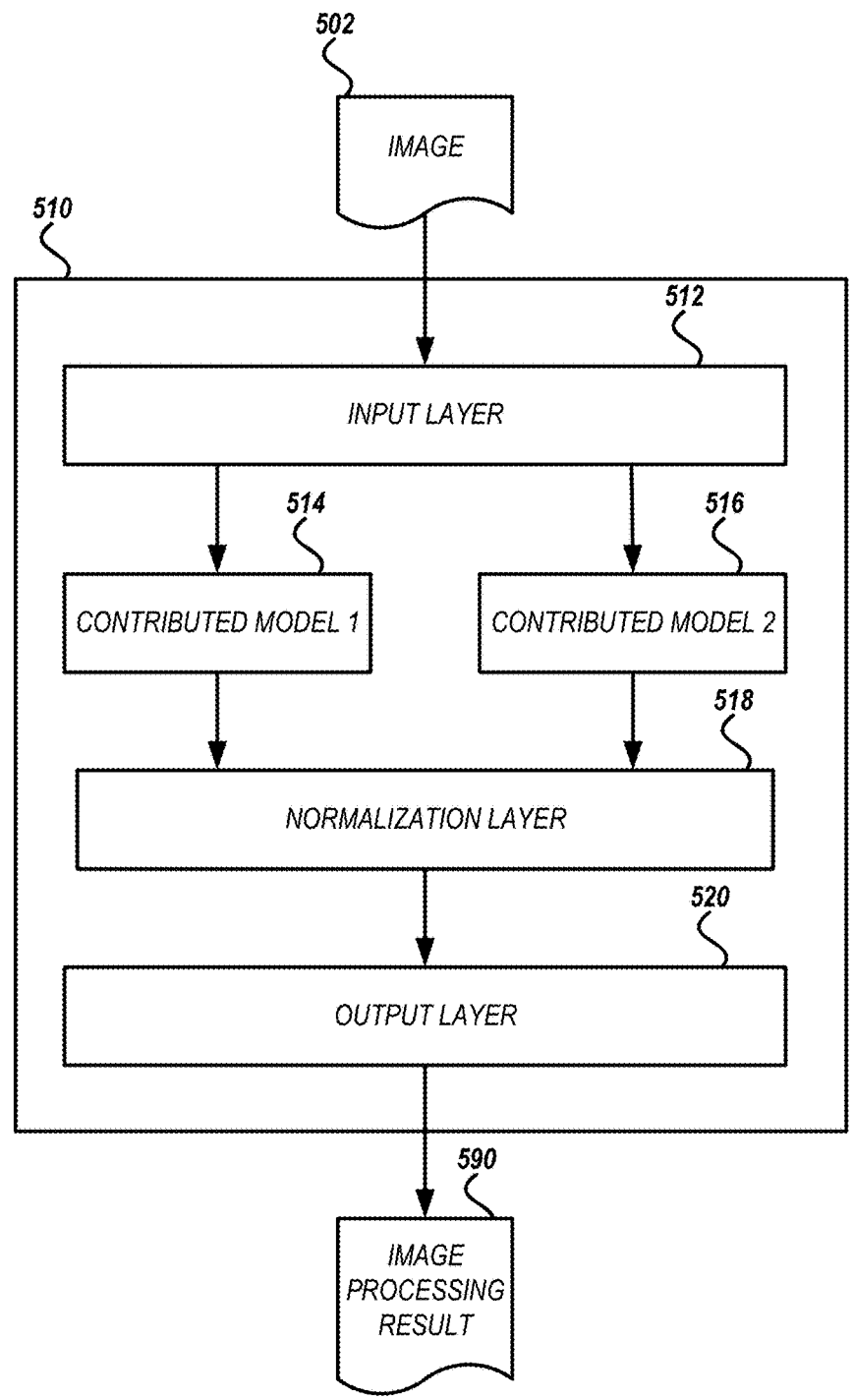
FIG. 5 is a block diagram of an example image model generated by the method of FIG. 3.

FIG. 5 is a block diagram of an example image model generated by the method of FIG. 3. The image model 510 may be an image processing model that receives an image 502 as an input. The image 502 is received at an input layer 512 of the image model 510. The input layer 512 provides the image 502 to each contributed model included in the image model 510. A contributed model 514 and a contributed model 516 are shown in FIG. 5. The contributed models are stored in the library and may be associated with different contributing users. To ensure the result of the image model 510 includes a consistent representation of the predictions, a normalization layer 518 is included. As shown in FIG. 5, the normalization layer 518 receives the outputs of the first contributed model 514 and the second contributed model 516. The normalization layer 518 then provides the normalized values to the output layer 520. In an alternate embodiment, the normalization layer 518 receives the output from the first contributed model 514 and provides a normalized result to an output layer 520. In such an embodiment, the second contributed model 516 is not normalized and provides its output directly to the output layer 520.

The output layer 520 consolidates the results into an image processing result 590 which is provided as an output from the image model 510. In some embodiments, the image processing result 590 includes a vector of confidence values where each element in the vector is associated with an object or object type. Table 2 provides an example image processing result for an image showing a laptop based on the objects detected by the models referenced in Table 1. In Table 1, the image processing result includes predication confidence values for each object or object type the image processing model was trained to detect or segment.

TABLE 1

| Vector Position | Object/Object Type | Confidence |
| --- | --- | --- |
| 0 | Basketball | 0.0 |
| 1 | Baseball | 0.2 |
| 2 | Hockey Puck | 0.30 |
| 3 | Smartphone | 0.35 |
| 4 | Laptop | 0.80 |
| 5 | Tablet | 0.40 |

Returning to FIG. 3, the method 300 at block 316 stores the image model generated at block 314 in the library. Storing the image model makes the model generated at block 314 available for generating subsequently requested models. Storing the image model makes the machine learning model generated at block 314 available for inclusion in an image processing service. For example, in some embodiments, a network service is associated with a network location. The network service receives an image for processing by the image model. In some embodiments, the network service includes security processing to ensure the images are processed only for authorized clients. Authorization is based on information included in the request or prior to receiving the request such as a security token, username or password information, or other credential. When the image is received at the endpoint, the image processing service retrieves the image model from the library and provides the image as an input to the image model. The result provided as an output from the image model is then returned as a response to the request. The response includes one or more of segmentation information or classification information for the object shown in the image. In some embodiments, the image model is stored in memory such as a cache or virtual machine instance. In such embodiments, the image model is retrieved at start up and, if provided, a specified refresh schedule. The method 300 ends a block 390, but may be repeated to generate a new machine learning model.

Figure 6:
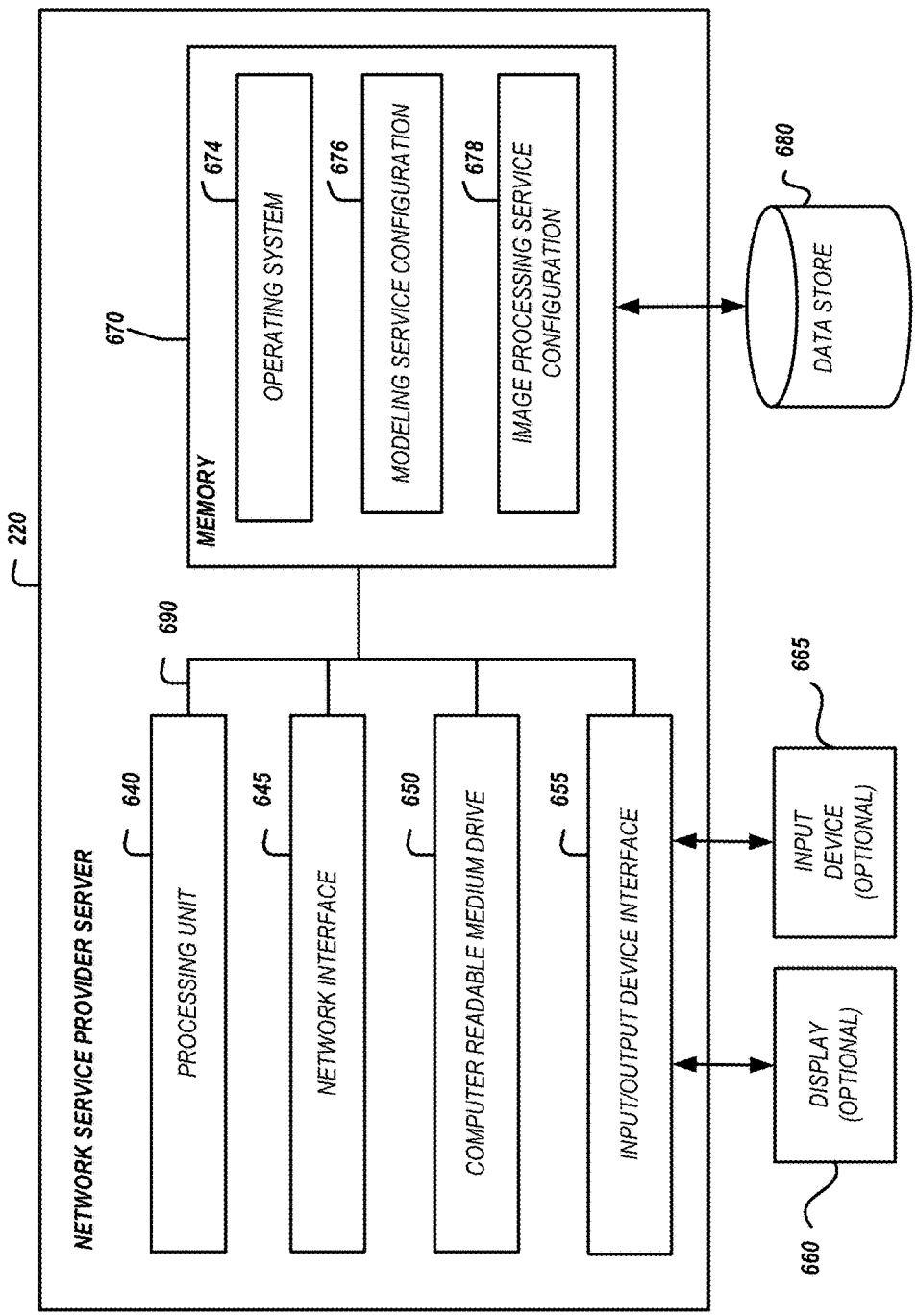
FIG. 6 is a block diagram depicting an illustrative architecture for a computing device providing modeling services.

FIG. 6 is a block diagram depicting an illustrative architecture for a computing device providing modeling services. An embodiment of the network service provider server 220 shown in FIG. 6 includes a processing unit 640, a network interface 645, a computer readable medium drive 650, an input/output device interface 655, and a memory 670. The network interface 645 provides connectivity to one or more networks or computing systems such as the network 210 shown in FIG. 2. The processing unit 640 receives information and instructions from other computing systems or services via the network interface 645. In some embodiments, the network interface 645 stores data directly to memory 670. The processing unit 640 communicates to and from the memory 670 and outputs information to an optional display 660 via the input/output device interface 655. In some embodiments, the input/output device interface 655 accepts input from an optional input device 665, such as a keyboard, mouse, digital pen, microphone, mass storage device, etc.

The memory 670 generally includes RAM, ROM, and/or other persistent, non-transitory computer readable media.

The memory 670 stores an operating system 674 that provides computer program instructions for use by the processing unit 640 or other elements included in the computing device in the general administration and operation of the network service provider server 220. In some embodiments, the memory 670 further includes computer program instructions and other information for implementing aspects of generating models described.

For example, in some embodiments, the memory 670 includes a modeling service configuration 676. The modeling service configuration 676 includes thresholds or other values to support the modeling operations, such as generating a model and an associated image processing service, described herein. The memory 670 shown in FIG. 6 also stores an image processing service configuration 678. The image processing service configuration 678 includes the configuration information for a specific image processing service such as the model supporting the image processing service, security information for the image processing service, or other service parameters for providing and executing the image processing service to a network service client or an access device.

In some embodiments, the configurations store specific values for a given configuration. For example, in some embodiments, the values are provided in a look up table indexed by one or more characteristics of the model or the information upon which the model was generated (e.g., a modeling request value, taxonomies, raining data, training data metrics, or training result(s)).

Rather than storing express values for a particular configuration element, one embodiment stores information that allows the network service provider server 220 to obtain a dynamically generated value for the given configuration element. For example, the identity of the default constraint engine may be specified as a network location (e.g., URL) in conjunction with username and password information to access the network location to obtain the modeling or image processing service parameters used by the network service provider server 220.

In the embodiment shown in FIG. 6, the memory 670 communicates with one or more auxiliary data stores, such as a data store 680. The data store 680 electronically stores data generated by the network service provider server 220 such as in servicing modeling requests, training models, providing image processing services, and the like.

The elements included in the network service provider server 220 are coupled by a bus 690. The bus 690 includes one or more of: a data bus, communication bus, or other bus mechanism to enable the various components of the network service provider server 220 to exchange information.

In some embodiments, the network service provider server 220 includes additional or fewer components than are shown in FIG. 6. For example, a network service provider server may include more than one processing unit 640 and/or computer readable medium drive 650. In another example, the network service provider server 220 may not be coupled to a display (e.g., the display 660) or an input device (e.g., the input device 665). In some embodiments, two or more network service provider servers together form a computer system for executing features of the present disclosure.

The crowd-sourcing of models is one way contributed artificial intelligence content can be shared to expedite generation of new artificial intelligence content. In some embodiments, the training data contributed by users is shared to allow users to train new machine learning models using one or more sets of contributed image data.

Figure 7:
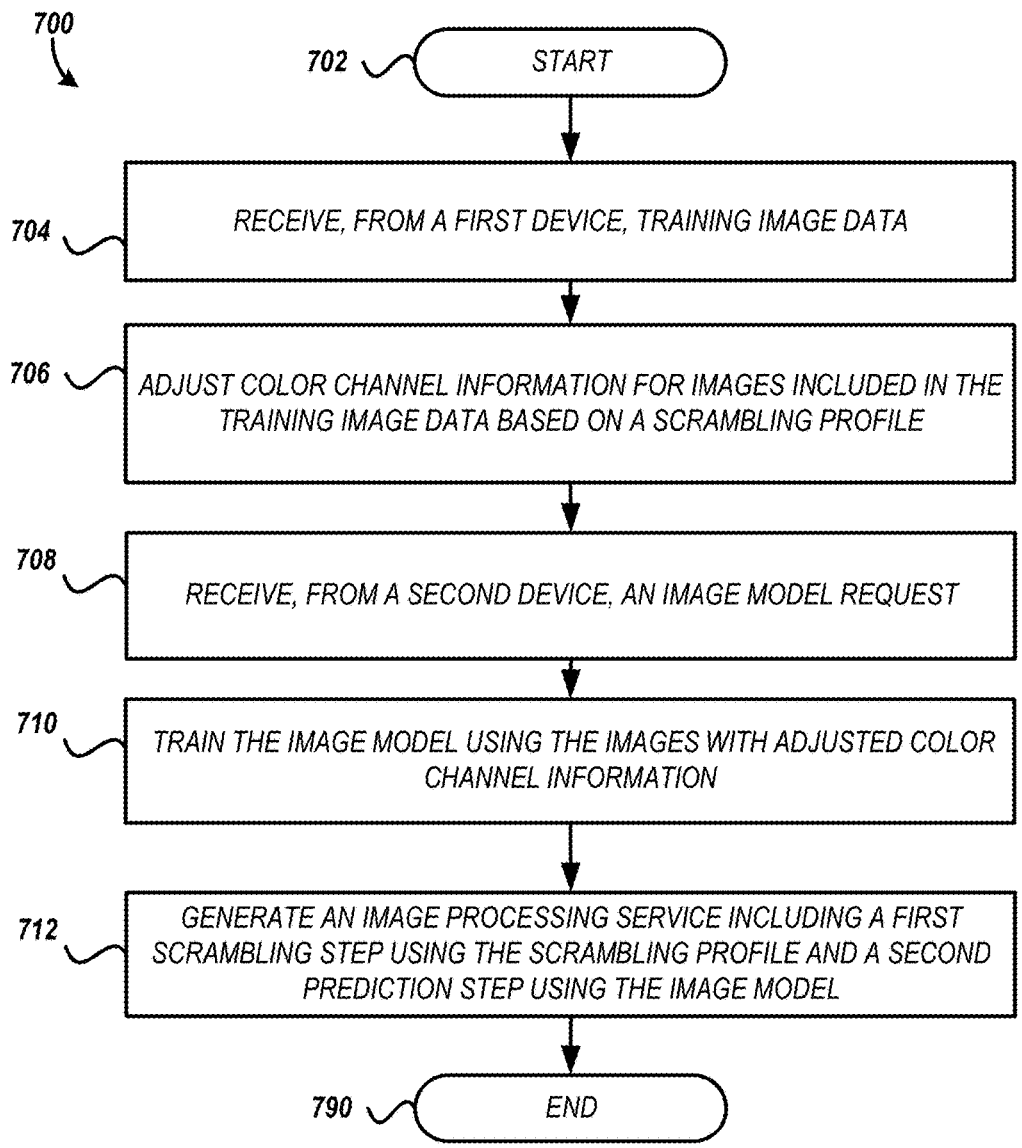
FIG. 7 is a process flow diagram showing an example of a method for generating an image model using shared training data.

FIG. 7 is a process flow diagram showing an example of a method for generating an image model using shared training data. The method 700 is implemented by a computing device such as the network service provider server 220 shown in FIG. 2 under the control of one or more processor. The method 700 illustrates one embodiment for securely receiving training data and generating the image model using the secured training data.

The method 700 begins at block 702. At block 704, training image data is received from a first device. The training image data includes labeled images including an identification of objects shown in the images. In some embodiments, the training image data includes or is associated with metadata to characterize the training images. For example, a taxonomy is used to provide a standard hierarchy of objects that can be shown in images. When the first device provides the training image data, a selection of at least one entry in the taxonomy may be required to allow the network service provider server 220 to later identify the training image data. In some embodiments, the network service provider server 220 defines multiple taxonomies based on domain. For example, there may be a different taxonomy for the domain of medical images as compared to the domain of house pets or plants.

At block 706, images included in the training image data are optionally scrambled. Scrambling is optionally provided to allow the contributor to protect the contributed images. The scrambling is performed according to a scrambling profile. As shown in FIG. 7, the scrambling includes adjusting the color channel information for each image such as the color channel values for the pixels included in an image. The details of the adjustment are specified by the scrambling profile. Scrambling can also be done by adding pre-generated values to pixels that can be correlated between the neighbors. The adjustment at block 706 is made optional by including a default scrambling profile which does not change the overall characteristics of the image. This provides a consistent pipeline for receiving contributed images and, if privacy is selected by the contributor, an alternate scrambling profile is applied.

At block 708, a request for an image model is received from a second device. The request may be similar to the modeling request 102 shown in FIG. 1. In some embodiments, the request identifies a task for the image model to perform. The task is at least one of: identifying a location of an object within an image or identifying the object within the image. In some embodiments, the task is another computer vision process. The request may include descriptive metadata that is used by the network service provider server 220 to identify applicable training data such as the training image data received at block 702.

At block 710, the image model is generated based on the request and the adjusted training image data. In such instances, the user contributing the training image data has not exposed the image data as it can be scrambled upon receipt. In some embodiments, the training is performed using the other models contributed by other users such via the method 300 shown in FIG. 3. In some embodiments, the training is performed without a prior model as the starting point. For machine learning embodiments, training a model includes adjusting the weights between nodes included in the image model such that the image model including the adjusted weights provides an image processing result that is more accurate than the pre-adjusted weights. To increase the accuracy, backpropagation or other machine learning techniques are used.

At block 712, an image processing service is generated using the image model and the scrambling profile. Because the image model was trained using scrambled images, any image to be processed by the image model should be similarly scrambled. As such, the image processing service includes a first scrambling step to adjust an input image according to the scrambling profile used to train the image model. Once the image is adjusted, a second step of analyzing the image using the image model is performed. The analysis provides an image processing result such as a prediction of what object(s) appear in the image. The scrambling step may be included in the model or as a pre-processing step of the image processing service.

The method 700 ends at block 790. The method 700 may be repeated to generate additional or alternative image models.

As discussed, image models generated using contributed images may be monitored to provide attribution to the users who contributed the images. For example, the significance of the class of images contributed by a user is one basis for generating a benefit allocation amount for a user. For example, if a first user contributes images showing a first class of objects and a second user contributes images showing a second class of objects, when allocating an attribution amount for contributors to the first class of objects, the portion allocated to the first user should be higher than the portion allocated to the second user.

Interactions with models trained by the image data is another basis for generating a benefit allocation amount for a user. For example, the number of times an image model is interacted with may be tracked and a portion of a benefit received from the image model may be proportionally allocated to each user contributing images that trained the image model based on the magnitude of the contribution. Equation (2) provides one expression of benefit allocation for a user.

$$b_{user} = b_{total}\left(\frac{c_{user}}{\sum_{x}^{n} c_x}\right)$$

where:
$b_{user}$ represents a benefit allocated to the user contributing training image data;
$b_{total}$ represents a total benefit for the generated image model;
$c_{user}$ represents a number of images contributed by the user;
$c_x$ represents a number images contributed by user x to the generated image model; and
n represents a total number of users contributing images to generate the image model.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a network service provider server, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A network service provider server can be or include a microprocessor, but in the alternative, the network service provider server can be or include a controller, microcontroller, or state machine, combinations of the same, or the like configured to generate and publish image processing services backed by a machine learning model. A network service provider server can include electrical circuitry configured to process computer-executable instructions. Although described herein primarily with respect to digital technology, a network service provider server may also include primarily analog components. For example, some or all of the modeling and service algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a network service provider server, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the network service provider server such that the network service provider server can read information from, and write information to, the storage medium. In the alternative, the storage medium can be integral to the network service provider server. The network service provider server and the storage medium can reside in an ASIC. The ASIC can reside in a user terminal. In the alternative, the network service provider server and the storage medium can reside as discrete components in a user terminal (e.g., access device or network service client device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some embodiments, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some embodiments, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of one or more processors,
receiving, from an electronic communication device, a request for an image processing model, wherein the request identifies:
(i) an object type to be identified by the image processing model, and
(ii) training data including a first image showing a first object of the object type and a second image showing a second object of the object type;
identifying, from a library of machine learning models, a first machine learning model based on the object type identified in the request;
identifying, from the library of machine learning models, a second machine learning model based on the object type identified in the request;
generating a first image processing result identifying the first object using the first machine learning model, wherein the first image processing result includes a first prediction confidence value;
generating a second image processing result identifying the second object using the second machine learning model, wherein the second image processing result includes a second prediction confidence value;
determining a normalization factor for the first machine learning model based on a comparison between the first prediction confidence value and the second prediction confidence value;
generating the image processing model using the first machine learning model, the second machine learning model, and the normalization factor,
wherein the image processing model provides an input image to each of the first machine learning model and the second machine learning model, and
wherein generating the image processing model includes:
generating a normalization layer that:
(i) receives image processing results from the first machine learning model, and
(ii) provides normalized image processing results based on the normalization factor, and
generating an output layer that:
(i) receives image processing results from the second machine learning model,
(ii) receives the normalized image processing results from the normalization layer, and
(iii) provides a final image processing result for the input image; and
storing the image processing model in the library of machine learning models.

2. The computer-implemented method of claim 1, further comprising:
storing interaction information for the image processing model, wherein interaction information for a specific interaction identifies which of the first machine learning model or the second machine learning model provided a highest confidence result for the specific interaction with the image processing model; and
determining an attribution amount for the first machine learning model, wherein the attribution amount based on a number of interactions identified by the interaction information which the first machine learning model provided the highest confidence result.

3. The computer-implemented method of claim 2, further comprising storing the attribution amount for the first machine learning model and another attribution amount for a third machine learning model, and
wherein identifying the first machine learning model comprises:
determining that the first machine learning model and the third machine learning model provide equivalent predictions;
determining that the attribution amount for the first machine learning model exceeds the another attribution amount for the third machine learning model; and
selecting the first machine learning model.

4. The computer-implemented method of claim 1, further comprising:
receiving, from an electronic computing device, training image data, wherein the training image data includes metadata describing an object type shown in images included in the training image data;
adjusting color channel values for pixels included in the images to generate scrambled training image data; and
training the first machine learning model using the scrambled training image data,
wherein generating the image processing model includes:
generating a scrambling layer that:
(i) receives the input image directed to the first machine learning model,
(ii) adjusts the color channel values for pixels included in the input image to generate a scrambled input image, and
(iii) provides the scrambled input image to the first machine learning model.

5. The computer-implemented method of claim 1, further comprising:
receiving, from the electronic communication device, an image for processing by the image processing model;
retrieving the image processing model from the library;
processing the image using the image processing model to generate an image processing result, the image processing result including at least one of segmentation information or classification information for an object shown in the image; and
transmitting the image processing result to the electronic communication device.

6. A system comprising:
one or more computing devices having a processor and a memory, wherein the one or more computing devices execute computer-readable instructions to:
receive, from an electronic computing device, a request for an image model, the request indicating an object type to be identified by the image model;
select, from a library of machine learning models, a first machine learning model and a second machine learning model associated with the object type;
generate the image model using the first machine learning model, the second machine learning model, and a normalization factor for image processing results of the first machine learning model,
wherein the image model provides an input image to each of the first machine learning model and the second machine learning model, and
wherein generating the image model includes:
generating a normalization layer that:
(i) receives image processing results from the first machine learning model, and (ii) provides normalized image processing results based on the normalization factor; and generating an output layer that:
(i) receives image processing results from the second machine learning model,
(ii) receives the normalized image processing results from the normalization layer, and
(iii) provides a final image processing result for the input image; and store the image model in the library of machine learning models.

7. The system of claim 6, wherein the one or more computing devices execute computer-readable instructions to:

generate a first image processing result identifying a first object in a first image using the first machine learning model, wherein the first image processing result includes a first prediction confidence value;

generate a second image processing result identifying a second object in a second image using the second machine learning model, wherein the second image processing result includes a second prediction confidence value; and determine the normalization factor for the first machine learning model based on a comparison between the first prediction confidence value and the second prediction confidence value.

8. The system of claim 6, wherein the request includes information identifying: (i) a characteristic for the image model to identify, wherein the characteristic comprises one of: detection of an object within an image or pixels representing the object with the image, and (ii) a set of reference images.

9. The system of claim 6, wherein the one or more computing devices execute computer-readable instructions to:

store interaction information for the image model, wherein interaction information for a specific interaction identifies which of the first machine learning model or the second machine learning model provided a highest confidence result for the specific interaction with the image model; and determine an attribution amount for the first machine learning model, wherein the attribution amount based on a number of interactions identified by the interaction information which the first machine learning model provided the highest confidence result.

10. The system of claim 9, wherein the one or more computing devices execute computer-readable instructions to store the attribution amount for the first machine learning model and another attribution amount for a third machine learning model, and wherein identifying the first machine learning model comprises:
determining that the first machine learning model and the third machine learning model provide equivalent predictions;
determining that the attribution amount for the first machine learning model exceeds the another attribution amount for the third machine learning model; and
selecting the first machine learning model.

11. The system of claim 6,
wherein the first machine learning model is associated with metadata identifying the object type, and
wherein the one or more computing devices execute computer-readable instructions to select the first machine learning model based on the metadata and the object type associated with the request.

12. The system of claim 6, wherein the one or more computing devices execute computer-readable instructions to:

receive, from a client device, an image for processing by the image model;
retrieve the image model from the library;
process the image using the image model to generate an image processing result, the image processing result including at least one of segmentation information or classification information for an object shown in the image; and
transmit the image processing result to the client device.

13. The system of claim 6, wherein the one or more computing devices execute computer-readable instructions to:

receive, from an client device, training image data, wherein the training image data includes metadata describing an object type shown in images included in the training image data;
generate scrambled image data based on the training image data and a scrambling profile, wherein an scrambled image included in the scrambled image data includes pixel information that differs from an image from the training image data used to generated the scrambled image; and
train the first machine learning model using the scrambled image data,
wherein generating the image model includes:
generating a scrambling layer that:
(i) receives the input image directed to the first machine learning model,
(ii) adjusts pixels included in the input image based on the scrambling profile to generate a scrambled input image, and
(iii) provides the scrambled input image to the first machine learning model.

14. A computer-implemented method comprising:
under control of one or more processors,
receiving, from an electronic computing device, a request for an image model, the request indicating an object type to be identified by the image model;
selecting, from a library of machine learning models, a first machine learning model and a second machine learning model associated with the object type;
generating the image model using the first machine learning model, the second machine learning model, and a normalization factor for image processing results of the first machine learning model,
wherein the image model provides an input image to each of the first machine learning model and the second machine learning model, and
wherein generating the image model includes:
generating a normalization layer that:
(i) receives image processing results from the first machine learning model, and
(ii) provides normalized image processing results based on the normalization factor; and
generating an output layer that:
(i) receives image processing results from the second machine learning model,
(ii) receives the normalized image processing results from the normalization layer, and
(iii) provides a final image processing result for the input image; and storing the image model in the library of machine learning models.

15. The computer-implemented method of claim 14, further comprising:
generating a first image processing result identifying a first object in a first image using the first machine learning model, wherein the first image processing result includes a first prediction confidence value;
generating a second image processing result identifying a second object in a second image using the second machine learning model, wherein the second image processing result includes a second prediction confidence value; and
determining the normalization factor for the first machine learning model based on a comparison between the first prediction confidence value and the second prediction confidence value.

16. The computer-implemented method of claim 14, further comprising:
storing interaction information for the image model, wherein interaction information for a specific interaction identifies which of the first machine learning model or the second machine learning model provided a highest confidence result for the specific interaction with the image model; and
determining an attribution amount for the first machine learning model, wherein the attribution amount based on a number of interactions identified by the interaction information which the first machine learning model provided the highest confidence result.

17. The computer-implemented method of claim 16, further comprising storing the attribution amount for the first machine learning model and another attribution amount for a third machine learning model, and
wherein identifying the first machine learning model comprises:
determining that the first machine learning model and the third machine learning model provide equivalent predictions;
determining that the attribution amount for the first machine learning model exceeds the another attribution amount for the third machine learning model; and
selecting the first machine learning model.

18. The computer-implemented method of claim 14, further comprising:
receiving, from a client device, an image for processing by the image model;
retrieving the image model from the library;
processing the image using the image model to generate an image processing result, the image processing result including at least one of segmentation information or classification information for an object shown in the image; and
transmitting the image processing result to the client device.

19. The computer-implemented method of claim 14, further comprising:
receiving, from an client device, training image data, wherein the training image data includes metadata describing an object type shown in images included in the training image data;
generating scrambled image data based on the training image data and a scrambling profile, wherein an scrambled image included in the scrambled image data includes pixel information that differs from an image from the training image data used to generated the scrambled image; and
training the first machine learning model using the scrambled image data,
wherein generating the image model includes:
generating a scrambling layer that:
(i) receives the input image directed to the first machine learning model,
(ii) adjusts pixels included in the input image based on the scrambling profile to generate a scrambled input image, and
(iii) provides the scrambled input image to the first machine learning model.

20. The computer-implemented method of claim 14, further comprising:
identifying a topical domain for a user associated with the request, wherein selecting the first machine learning model comprises:
determining that the topical domain is associated with a domain associated with the first machine learning model.

* * * * *